Sept. 30, 1958 — Y. A. YOLER — 2,853,918
HIGH SPEED PHOTOGRAPHIC DEVICE

Filed Feb. 16, 1956 — 3 Sheets-Sheet 1

Inventor:
Yusuf A. Yoler,
by His Attorney.

Inventor:
Yusuf A. Yoler,
by Clifford B. Levine
His Attorney.

United States Patent Office 2,853,918
Patented Sept. 30, 1958

2,853,918

HIGH SPEED PHOTOGRAPHIC DEVICE

Yusuf A. Yoler, Schenectady, N. Y., assignor to General Electric Company, a corporation of New York Application February 16, 1956, Serial No. 565,934

16 Claims. (Cl. 88—16)

This invention generally pertains to a high-speed motion picture camera and more particularly to a camera for taking a plurality of regularly time-spaced, extremely rapid exposure photographs for recording a transient phenomenon whose duration may be many times longer than the exposure time of each photograph.

Where it is desirable to make motion picture studies of rapidly varying phenomena which may persist for many milliseconds, short exposures of less than or greater than 1 microsecond duration may be necessary to record individual photographs of this rapidly moving motion and, it may be, additionally necessary to make a few hundred or more such exposures or frames at a variable rate, in the range of 1000 to 1,000,000 frames per second, for recording the variation of such transient phenomena from time-to-time over its full range.

Heretofore, photographic devices for recording high-speed motion have been devised that are capable of making individual exposures for as short a time duration as 1 millionth of a second, and that can also make a fixed number of such exposures or frames. However, it has not heretofore been believed possible to design a photographic device that is capable of moving a photographic film at a sufficient speed to expose pictures of usable size at the rate of 1 million per second, and for this reason known prior devices use a stationary film and form a fixed series of photographs on this film, displaced from each other in both time and position by such means as sweeping a light beam across a plurality of spaced stationary lenses, each of which projects individual light forming a single photograph on a different portion of the stationary film. However, in such devices, the time of exposing the film to form each photograph and the rate of making such photographs are interdependent and not independently variable, since sweeping the light beam across the lenses at a greater or lesser speed to vary the number of photographs taken per second also changes the time of exposing each individual photograph. Consequently, since the number of such photographs taken per second cannot be varied without also varying the exposure time for each photograph, and since practical considerations, such as the length of stationary film that may be supported within a reasonably sized film-holder, limit the number of photographs that may be taken, such prior devices are limited to the recording of transient phenomena having a relatively short persistence.

To overcome these disadvantages and provide a more versatile photographic device, the present invention includes a means for independently controlling both the exposure time of each photograph and the framing rate or number of such photographs taken in a given time, whereby individual high-speed motion picture images may be taken with the desired short exposure, and consecutive photographs may be so spaced in time as to provide a representative motion picture study of a transient phenomenon lasting for a long time period referenced to the short exposure time of each photograph. More specifically in accordance with the present invention, the means for independently controlling the exposure time is comprised of a means for sweeping a light beam from the object to be photographed along a desired path at a variable speed and exposing each frame or photograph of a sensitized film by applying this beam to the film only as the sweeping beam passes a predetermined variable area of its swept path. Thus, assuming that the beam is swept at a constant speed, the exposure time of each frame may be increased by lengthening the portion or area of its swept path during which it exposes the film, and likewise each exposure time may be decreased by shortening the portion of the sweeping beam path when this beam is applied to expose the film. Additionally, in accordance with the broadest aspect of the present invention, this film is not stationary but rather placed in motion at a speed proportional to, but much lower than, the speed of sweeping this light beam, whereby as each portion or frame of the film is exposed, an immediately adjacent portion of unexposed film is placed in a position to be exposed by a subsequently sweeping beam and/or by the same beam as it traverses a different length of its path. Consequently, by varying the repetition rate and speed of the sweeping beams, and independently adjusting the length of the traversed path wherein the beam is used to expose the film, independent control of the exposure time for each photograph and the time duration between successive photographs may be obtained.

It is accordingly one object of the present invention to provide a device for successively taking a number of high-speed photographs of a rapidly varying phenomenon, and having independent control of both the time for exposing each photograph and the time between successive photographs.

A further object of the present invention is to provide a less expensive, less complex, and more versatile device for successively taking high-speed photographs of a rapidly varying phenomenon having a long-time persistence referenced to its rapidity of variation.

A still further object of the present invention is to provide a device capable of making the maximum number of successive photographs of a rapidly varying phenomenon of long-time persistence using standard available film useable with standard available projection devices.

A still further object of the present invention is to provide a less expensive, less complex, and more versatile device for taking successive high-speed individual photographs of a rapidly varying phenomenon.

Other objects and many attendant advantages will be more readily comprehended by those skilled in this art upon a detailed consideration of the following specification taken with the accompanying drawings, wherein.

Figure 1:
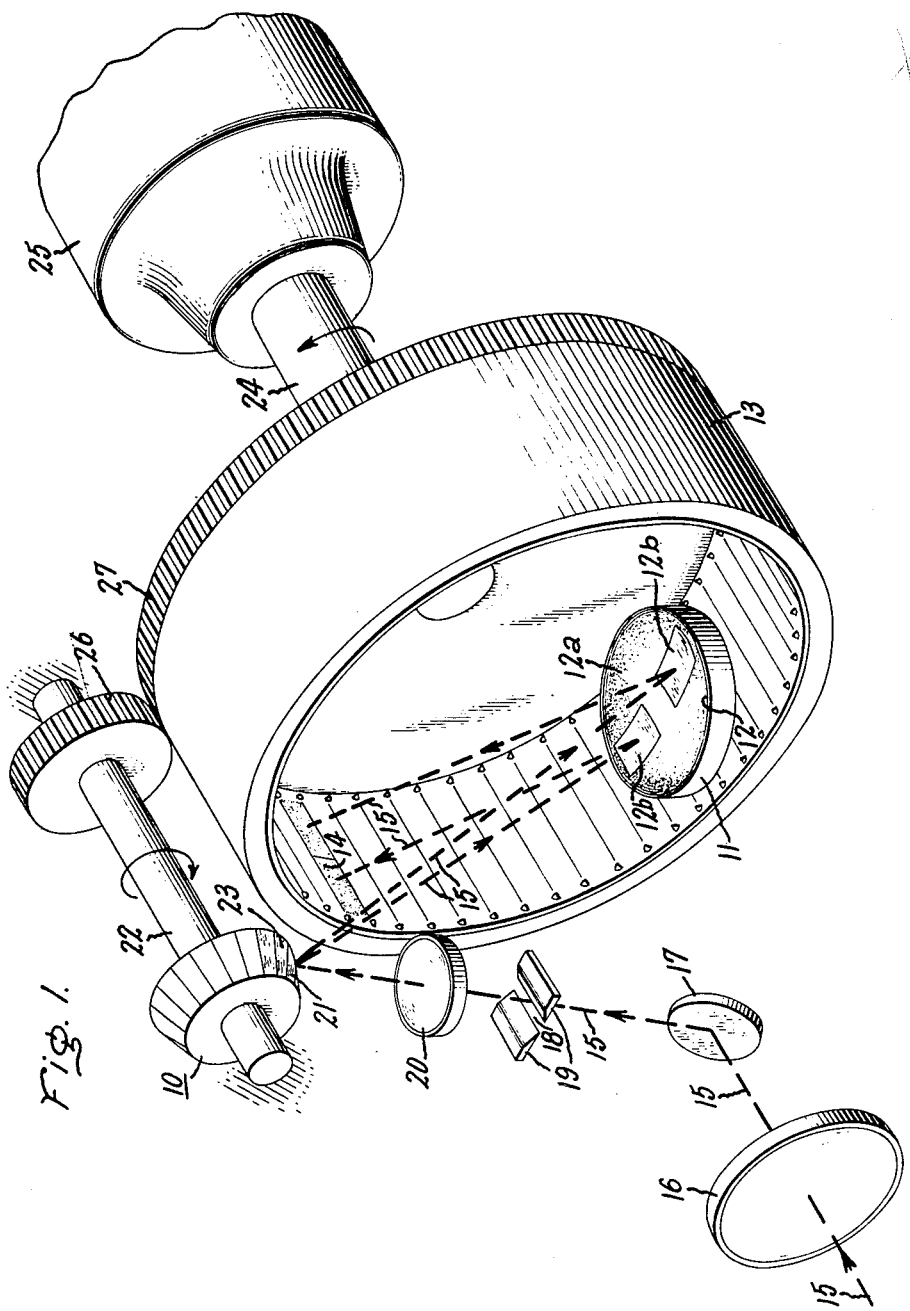
Fig. 1 is a perspective view illustrating one preferred embodiment of the invention.

Referring now to Fig. 1 for a detailed consideration of one preferred embodiment of the present invention, there is generally shown a rotatable, multi-face mirror device 10, a reflecting mirror 11 having a spherically shaped reflecting surface 12 covered by an opaque mask member 12a having window openings 12b, and a rotatable hollow cylindrically-shaped member 13 supporting an endless light-sensitive film 14 about its inner surface.

A light beam 15 from a desired object or phenomena to be photographed (not shown) is directed through an objective lens 16 and reflected by a planar mirror 17 through slitted openings 18 between knife edged members 19, and through an image lens 20 to strike one of the planar reflecting surfaces 21 of multi-face mirror 10. As mirror 10 is rotated about the axis of its driving shaft 22, this planar reflecting face 21 revolves and sweeps this light beam 15 in a path across the surface of mask member 12a, and through windows 12b for given portions of the swept path. When passing over the opaque portions of mask 12a, no light is reflected from the spherical mirror surface 12, but as the beam passes through the window openings 12b and strikes the spherical reflecting surface 12 of the mirror 11, it is reflected upwardly as shown to strike and expose a single frame portion of the light-sensitive film 14. The lower mirror opening 12b is so positioned as to reflect the light beam 15 to expose the right-hand half portion of the film, which is preferably of a 16-mm. size, and the upper window opening 12b is so positioned as to expose the left-hand portion of the light-sensitive film 14, as shown.

Thereafter, as the multi-face mirror 10 continues to rotate, a second mirror surface 23 is brought into position to receive and reflect the incoming light beam 15, whereby this beam is again swept across the mask member 12a and through windows 12b to expose adjacent left and right images on the film. However, during rotation of the multi-face mirror 10 necessary to bring the second reflecting mirror surface 23 into position to receive the light beam 15, the hollow film drum 13 is also rotated about the axis of its driving shaft 24 to a desired position to bring the next succeeding unexposed portion of film 14 into position to receive reflected light 15, whereby the light beam transmitted by this second mirror 23 in a sweeping path across the mask 12a is reflected upwardly by means of the spherical mirror 12 to strike and expose the next succeeding left and right-hand portions of the film, and form the third and fourth photographs.

Thus, as the multi-face mirror 10 and film drum 13 are rotated, each of the planar reflecting surfaces of the multi-face mirror 10 is successively brought into position to receive and reflect the incoming light beam 15 and direct this light beam in a sweeping path across the mask surface 12a. Each of the swept beams is passed across the surface of this mask 12a and, in turn, through the two window openings 12b to enable successive left- and right-hand images on the film to be exposed by the reflections through the window openings.

From the above, it is evident that the exposure time of each separate photograph on the film 14 is determined by the time the sweeping beam 15 passes through the associated window opening 12b, since only when this beam strikes the exposed reflecting surface 12 of spherical mirror 11 is any light-reflected to the film 14. Consequently, by shortening or widening the mask openings 12b, the photographic exposure time may be correspondingly decreased or increased, respectively, as desired.

Additionally, it is evident that with this arrangement the framing rate or number of separate images made per second is dependent upon the number of sweeping beams that are transmitted per second, which in turn may be varied by increasing the speed of rotation of the rotating mirror arrangement 10, or increasing the number of separate planar mirror surfaces, such as 21 and 23, associated with this multiface mirror. However, by increasing or decreasing the rate of rotating the multi-face mirror 10 to change the number of sweeping light beams per second, the speed of each sweeping light beam is likewise increased or decreased, thus changing the exposure time of each photograph, which as stated above depends upon the time it takes the light beam to travel across the window openings 12b in the mask 12. To maintain this exposure time constant irrespective of the speed of sweeping the light beam, the window openings 12b may be enlarged or shortened to compensate for the change in speed of the beam, and thereby maintain a constant exposure time period, as desired.

Thus, by means of the present invention, it is observed that the exposure time and framing rate are independently variable; the exposure time of each photograph being controllable by adjusting the size of the window openings 12b, and the framing rate being controllable by varying the speed of motor 25 to varying the number of sweeping light beams per second. Motor 25 rotates film drum 13 by shaft 24 and rotates the multi-face mirror 10 by shaft 22, shaft 22 being preferably driven by spur gears 26 and 27 with movement of film drum 13, as shown.

Heretofore, it was not believed possible with the then present state of knowledge, to design a photographic device capable of moving photographic film at a sufficient speed to expose pictures of usable size at rates from 1000 to 1,000,000 per second. For this reason, known cameras or photographic arrangements capable of taking pictures at these rates were compelled to use a stationary film, resulting in certain disadvantages discussed above. In accordance with the present invention, however, the incorporation of the unique "optical levering arrangement" to be hereafter described permits the film to be moved at a much lower speed than the speed of the sweeping beam 15, making it practical to design a rotating or otherwise movable film-carrying member, such as drum 13, which can support a sufficient length of film to enable at least a few hundred photographs or frames to be made, or more depending upon the diameter of drum 13. Furthermore, this unique "optical lever" permits the individual adjustment or control of both the exposure time and framing rate over wide ranges, enabling phenomena of both relatively long and short duration to be recorded on film by a succession of photographs.

Figure 2:
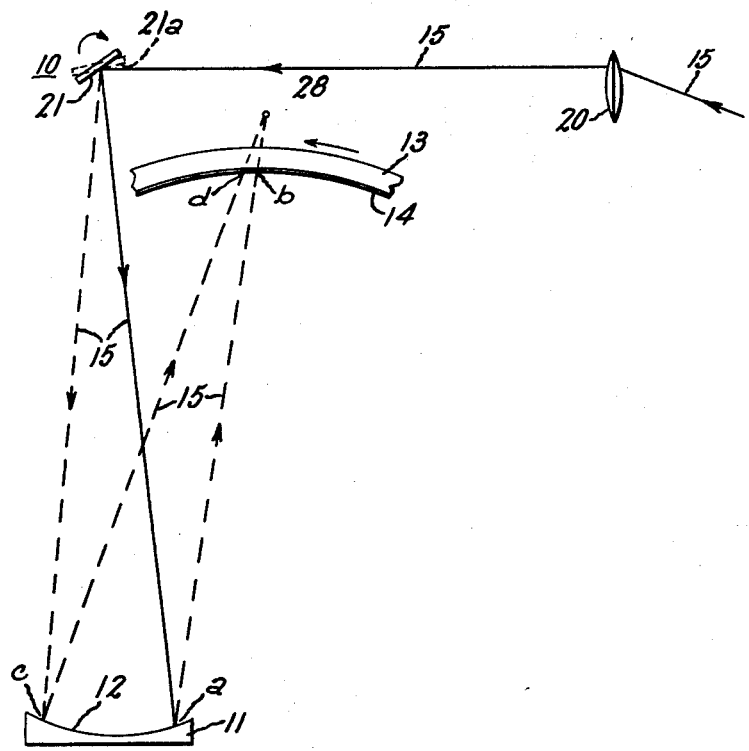
Fig. 2 is a diagrammatic line view illustrating the preferred "optical lever" arrangement of Fig. 1.

Referring now to Fig. 2 for a consideration of one preferred "optical levering arrangement," and considering the path of a single light ray (solid line) 15 as it is directed into the camera through lens 20; this single light ray 15 strikes one reflecting planar surface 21 of rotatable multi-face mirror 10 and is reflected downwardly to the right-hand point a of the spherical reflecting surface 12 of mirror 11, and again reflected upwardly by this sperical surface to expose the film 14 at point b. As this mirror 21 rotates in a clockwise direction to its position shown in the dotted lines, this light beam 15 is swept in a first path over the spherical surface 12 of mirror 11 reaching left-hand point c. However, as is characteristic of spherical mirrors, light rays issuing from a point source are reconverged to a point 28 conjugate to this source. Therefore, despite the fact that the light ray 15 may have been swept across the spherical mirror surface 12 at high speed, the reflected image of this beam is stationary at the point 28 conjugate to the mirror surface. In accordance with the present invention, the film 14 is positioned to intercept this reflected ray 15 proximate the conjugate point 28, whereby the reflection of this ray from the left-hand portion c of spherical mirror 12 strikes the film at position d, which is quite close to its earlier position b, due to the converging property of the spherical mirror. Thus, as the light ray 15 is swept across the spherical mirror surface 12 over the relatively long distance from point a to point c in a first path the reflected image of this ray in a second path being directed to the film only moves over the much shorter distance from point b to d, which may be but a small portion, as shown, of its original travel from point a to point b, depending upon the selected geometric positioning of these members. Otherwise stated, the reflected light ray 15 traveling in a second path to the film 14 is moving at a much slower speed than the speed at which it is swept across the spherical reflecting surface 12 and, in fact, is almost stationary, depending upon the distance between the film 14 and the spherical mirror conjugate point 28. It is preferred to position mirror 21 at a distance equal to radius of curvature of the spherical mirror to enable the best focusing of light rays at the conjugate point. In this case point 28 is also located at a distance equal to the radius of curvature. However, to obtain "space resolution" of the image, or otherwise stated to eliminate any relative movement of the light ray and film during exposure of each photograph, it is, of course, necessary to move the film in the direction shown by the arrow, whereby as the reflected light ray travels in the second path from point $b$ to point $d$, the film 14 is also moved a like distance resulting in a stationary image being formed on this film. Since the exposing light ray traveling from point $b$ to point $d$ is moving at such a relatively slow speed, it is evident to those skilled in the art that the film 14 may also be moved or driven at this slow speed without practical difficulty. Thus, it is observed why this arrangement may be truly termed an "optical lever arrangement," since it operates to reduce the sweeping speed of a moving light beam being transmitted along one path to a much slower speed of movement along a second path.

As the next succeeding planar reflecting mirror surface 23 (Fig. 1) of the multi-face mirror 10 is brought into position and rotated, the next succeeding light image to be photographed is again swept across the spherical reflecting surface 12 passing from the right-hand point $a$ thereof to the left-hand point $c$. This again results in a reflection of this moving light ray to sweep across the second path from position $b$ to position $d$. However, since the film is continuously driven at the same speed as that of the light ray sweeping along this second path, this reflected light ray strikes the next succeeding unexposed portion of the film, forming the next succeeding photograph, as best shown by Fig. 1.

By properly positioning the film with respect to the spherical mirror, and suitably arranging the location and size of the planar reflecting surfaces on the multi-faced mirror member 10, each succeeding photograph may be formed substantially immediately adjacent the preceding photograph on the film thereby eliminating any dead spaces in between successive photographs and enabling the maximum number of such photographs to be taken on a given length of film. This feature is of considerable practical importance for two reasons. Initially it minimizes the size of the drum 13 needed to provide a given number of photographs and secondly it enables the projection and display of the developed film with the use of standard available motion picture projection apparatus. In this same connection, it is also evident that the elements of the optical system may be so positioned as to form photographic images on the film of standard commerical 8-mm. or, 16-mm. size or other size, as desired.

Figure 3:
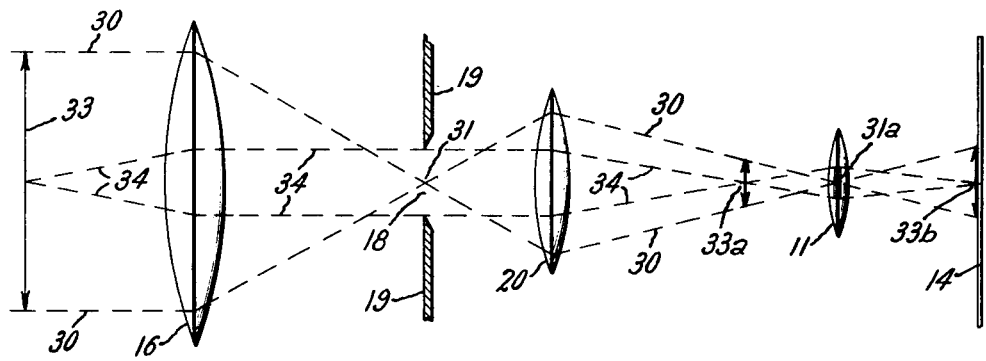
Fig. 3 is a view diagrammatically illustrating the optical projection of a single photograph by means of this preferred embodiment of the invention.

Referring now to Fig. 3 for an understanding of the manner of obtaining good optical quality or good "time resolution" of each photograph in accordance with the present invention, the "field lines" 30 or rays from the light source (not shown), which may be represented as parallel lines originating from a source distant from the system, are converged and focused by the objective lens 16 at position 31 in the opening 18 between slitted members 19, thereby compressing all of the desired light within this slit opening. Slit 18 is then imaged at point 31$a$ by means of an image lens 20 upon the spherical mirror 11 (which is shown herein as a converging lens rather than a converging spherical mirror for purposes of simplifying the illustration). Spherical mirror 11 then diffuses this background field light from the light source to prevent forming an image of the light source upon the film 14, as shown. However, the light beams reflected or generated by the desired object or phenomena 33, and which may be represented by the "object lines" 34, are so focused by means of the objective lens 16 and the image lens 20 as to form an image of the object at point 33$a$ which is displaced from the spherical mirror 11, and a second object image is then formed by means of the converging spherical mirror 11 directly upon the film 14 at 33$b$ to form a light image of the desired phenomena 33 upon the film. By this arrangement, it is observed that all of the "background light" and other light rays entering the camera from other than the desired object are diffused upon reaching the film, and therefore do not form an image upon the film, whereas the light rays from the desired object to be photographed are properly focused by the optical lens-and-mirror system to form a distinct image 33$b$ upon the film. By so arranging the optical system as to focus the slit area 18 (containing all of the light beams) upon the spherical reflecting mirror, good "time resolution" is obtained since the complete "bundle" of light rays passing through slit 18 is compressed within a very small area in relation to the area of the mirror surface, thereby making it possible to expose the complete frame for the same time interval as this beam is swept over the windows 12$b$ and strike the converging spherical mirror surface as shown in Fig. 1.

Although this above description is not in any way to be considered a rigorous and technically complete theory and exposition on the focusing of these light rays in accordance with the present invention, it is believed evident to those skilled in the optical art that the preferred arrangement illustrated and described does provide photographs having good "time resolution."

Since the present invention provides both "space resolution" by eliminating any relative movement between the light image and film during the time of exposure, and good "time resolution" by focusing all of the light beams passing through slit 18 on a very small area of the spherical reflecting mirror surface 12, it is evident that the optical arrangement of the present invention provides photographs of good optical quality or exposures that are optically resolved in both time and space.

Figure 4:
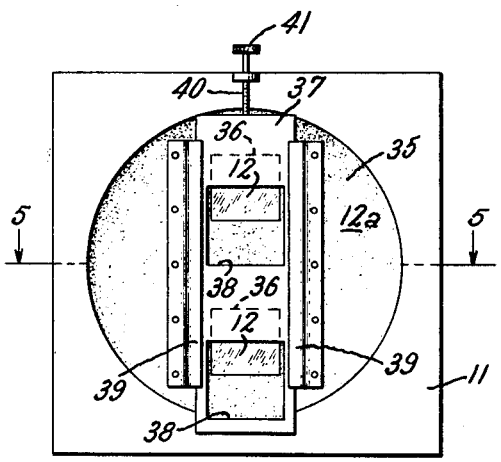
Fig. 4 is a detailed plan view illustrating preferred structure enabling adjustment of the exposure time of each photograph.
Figure 5:
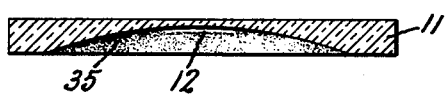
Fig. 5 is a sectional view through line 5—5 of Fig. 4 showing the preferred spherical mirror device.

Figs. 4 and 5 illustrate one preferred form which the spherical mirror 11 and the adjustable masking means 12$a$ may take in accordance with the present invention. As shown, mask member 12$a$ may be comprised of an opaque base covering 35 overlying the spherical reflecting mirror surface 12 and having two windows or fixed openings 36 cut therethrough. Mounted for reciprocal movement over these windows 36 is positioned a plate 37 also having two windows 38 therethrough. As shown, when the plate 37 is so positioned that its windows 38 are in coincidence with windows 36 of the base covering 35, the maximum area of the spherical reflecting mirror surface 12 is exposed through the two coincident window openings. On the other hand, when the plate 36 is so positioned that its windows 38 are entirely out of coincidence with the windows 36 through the opaque base covering 35, then the spherical reflecting mirror surface 12 is entirely covered. Plate 36 adapted to slide between two channels 39 on either side thereof, and being positioned by threaded shaft 40 in response to the manual positioning of a knob 41, may be reciprocally moved to any position intermediate full coincidence of the windows or lack of coincidence thereof, thereby to vary the exposed portions of the spherical reflecting mirror surface 12 as desired, and accordingly change the exposure time of the photographs as discussed above.

Additionally, it is observed that the present invention provides photographs of standard commercial sizes and with no wasted spaces in between consecutive pictures. These features enables the use of available film and projection equipment eliminating the need for specially devised film, and projection apparatus, together with reducing the size of a drum type film holder and enabling the use of available film feeding devices, if desired.

Thus it is observed that the present invention provides a high-speed motion picture camera having independent control of the exposure time and framing rate, as well as providing individual photographs that are optically compensated in both space and time.

Although the preferred embodiment as illustrated and described teaches specific elements and components for performing these functions, as is required by the patent laws, it is believed evident to those skilled in the art that these specific elements and components, including the means for sweeping the light beam, focusing, masking, and the like, may take many other forms. Furthermore, although this disclosed embodiment shows means for repetitively sweeping but a single light beam to make two photographs with each sweep, it is believed evident that this invention is not so limited, since but minor changes may be employed to provide a number of sweeping light beams, as well as a number of spherical reflecting mirrors or mask openings, or the like to enable a greater number of photographs to be taken as well as variations in the maximum framing rate or exposure time.

Since these and many other modifications are believed obvious to those skilled in the art upon a consideration of the present invention, this invention is to be considered as being limited only in accordance with the following claims appended hereto.

What is claimed is:

1. In a camera for forming a series of photographs on a light sensitive film of an object transiently moving at high speed, means for repetitively diverting a light beam received from the object to provide a successive series of sweeping beams along a given path at high speed, means receiving each said sweeping beam passing a variable predetermined region along its first path for diverting said beam along a second path at a much slower speed, said diverting means including a member having a spherical reflecting surface positioned along said first path and within said predetermined region to receive each sweeping beam and adapted to reflect each sweeping beam to form a stationary reflected image at the conjugate point of its spherical reflecting surface, and means for moving said film to intercept the reflected beam from the spherical surface at a position displaced from said conjugate point, said moving means traveling at a speed in synchronism with the speed of the reflected beam intercepting the film thereby eliminating any relative movement between the reflected light and the film.

2. In the camera of claim 1, means for adjusting said predetermined region to vary the exposure time of each said photograph.

3. In the camera of claim 1, means for varying the repetition rate of diverting said beam along said first given path to vary the number of photographs taken within a given time interval.

4. In the apparatus of claim 1, means for adjusting said predetermined region, and means for varying the repetition rate of diverting said light beam along said first given path, thereby providing independent adjustment of the time of exposing each photograph and the number of such photographs taken within a given time interval.

5. A device for permitting light of extremely short duration to expose a light-sensitive film comprising: means for sweeping said light along a first path at high speed, means responsive to said light passing over a predetermined adjustable length of said path for diverting said light along a second sweeping path during the time it passes across said given length, said diverting means adapted to converge all light incident on different portions thereof to a focal point at a given distance therefrom, and means for moving said film along said second path to intercept said light proximate to but spaced from said focal point and at a speed in synchronism with the speed at which said transmitted light passes along said second path, said diverting means including a member having a spherical shaped reflecting surface along said given length of said first path, and a focal path at a given distance therefrom, and said film being positioned to intercept said light image reflected from said spherical mirror at a position proximate to said focal point.

6. In a camera for forming a series of photographic exposures on a light-sensitive film of an object transiently moving at high speed, means for successively directing a light beam from said object to sweep along a first arcuate path at high speed, and means for exposing at least one different portion of said film during the time interval of each sweep of the beam, said exposing means including a means receiving each sweeping beam passing across a predetermined region in its first path for directing said beam to sweep along a second arcuate path at a much slower speed, and including a means for moving said film along said second path in synchronism with the beam travel along said second path and through a distance equal to the width of each photographic exposure during each sweep of the light beam over said first path.

7. In a camera for forming a series of photographs on a light sensitive film of an object transiently moving at high speed, means for repetitively diverting a light beam received from the object to provide a successive series of sweeping beams along a given path at high speed, means receiving each said sweeping beam passing a variable predetermined region along its first path for diverting said beam along a second path at a much slower speed, said diverting means including a member having an arcuately shaped reflecting surface within said predetermined region to receive each sweeping beam and reflect said beam to form a stationary image thereof at the conjugate point of its arcuate surface, and means for moving said film to intercept the reflected beam from the arcuate surface at a position displaced from said conjugate point, said moving means traveling at a speed in synchronism with the speed of the reflected beam intercepting the film thereby eliminating any relative movement between the reflected light and the film.

8. In the camera of claim 7, means for adjusting said predetermined region to vary the exposure time of each said photograph.

9. In the camera of claim 8, means for varying the repetition rate of diverting said beam along said first given path to vary the number of photographs taken within a given time interval.

10. In the camera of claim 9, said moving means continuously positioning said film through a distance equal to the width of each photographic exposure during each sweep of the light beam whereby each photograph on said film is positioned immediately adjacent the preceding photograph.

11. In a camera for forming a series of photographs on a light sensitive film of an object transiently moving at high speed, means for converging light from said object to form a narrow beam upon a small area, means for repetitively diverting the light received upon said area to provide a successive series of sweeping narrow light beams along a first given path at high speed, means receiving each sweeping beam passing a variable predetermined region along said first path for directing said beam along a second path at a much slower speed, said variable predetermined region being relatively wide in the direction of said first path in relation to the width of said light beam, and means for moving said film to intercept said light beam along said second path, said moving means traveling at a speed in synchronism with the speed of the intercepted light beam thereby eliminating any relative movement between the light beam and film to form a latent photograph optically resolved in space.

12. In the camera of claim 11, means for adjusting said predetermined region to vary the exposure time of each said photograph.

13. In the camera of claim 11, said diverting means including a member having an arcuately shaped reflecting surface within said predetermined region to receive each sweeping beam and reflect said beam in a converging manner to sweep across said second path.

14. A camera for forming a series of photographic exposures on a light-sensitive film of an object transiently moving at high speed comprising: means for repetitively diverting a light beam received from the desired object to successively sweep along a first given path at high speed, and means for exposing each different portion of said film during the time interval of each sweep of the beam to form each photograph; said exposing means including a means receiving each sweeping beam passing across a predetermined region in its first path and diverting said beam in a second sweeping path at a much slower speed during the time interval it passes across said predetermined region, and including a means for moving said film in synchronism with the slower speed of movement of said beam along the second sweeping path and in a position to intercept said second light beam and be exposed to the light beam, thereby to form a latent photograph, whereby relative movement between said light beam and film along the second path is eliminated, and means for adjusting said predetermined region to vary the exposure time of each photograph.

15. A high speed camera for rapidly exposing a light sensitive film comprising: means for repetitively diverting a received light beam to successively sweep along a first given path at high speed, and means for exposing a different portion of a film during the time interval of each sweep of the beam, said exposing means including a means receiving each sweeping beam passing across a predetermined region in its first given path and diverting said beam along a second sweeping path at a much slower speed during the time interval it passes across said predetermined region, and including a means for moving said film in synchronism with the slower speed of movement of said beam along the second sweeping path and in a position to intercept said like beam and be exposed to the light beam, thereby to form a latent photograph, means for varying the repetition rate of diverting said light beam along said first given path to vary the number of said photographs taken within a given time interval, and means for adjusting said predetermined region, thereby providing independent adjustment of the time of exposing each photograph and independent adjustment of the number of such photographs taken within a fixed time interval.

16. A high speed camera for forming a series of photographs on a light-sensitive film of a rapidly moving phenomena comprising: means for repetitively sweeping light received from the phenomena in an arcuate path at high speed, light reflecting means provided with an arcuate surface positioned to receive said light along a given portion of said path and direct said light to a focal point, means for moving said film along an arcuate path symmetrically confronting the arcuate surface of said reflecting means and at a position displaced from said focal point, said moving means traveling at a speed in synchronism with the sweep of the light intercepting the film, thereby eliminating any relative movement between the reflected light and the film, and optical means for imaging said phenomena on the film.

References Cited in the file of this patent

UNITED STATES PATENTS 2,668,473   Brixner _____ Feb. 9, 1954

OTHER REFERENCES

"Isotransport Camera for 100,000 Frames Per Second," pages 130–144 in Journal of the Society of Motion Picture and Television Engineers, Miller et al., vol. 60, February 1953.